United States Patent
Sun et al.

(10) Patent No.: US 6,935,918 B2
(45) Date of Patent: Aug. 30, 2005

(54) REFLECTING DEVICE FOR FLAT PANEL DISPLAYS AND METHOD OF MAKING THE SAME

(75) Inventors: Ming-Shen Sun, Hsinchu (TW); Kai-Yu Sun, Hsinchu Hsien (TW); Hsiao-Te Yang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 34 days.

(21) Appl. No.: 10/615,180

(22) Filed: Jul. 9, 2003

(65) Prior Publication Data

US 2004/0100177 A1 May 27, 2004

(30) Foreign Application Priority Data

Nov. 21, 2002 (TW) .......................................... 91133998

(51) Int. Cl.⁷ ................................................. H01J 9/06
(52) U.S. Cl. ......................................................... 445/66
(58) Field of Search ................................ 445/66; 257/10

(56) References Cited

U.S. PATENT DOCUMENTS 6,507,049 B1 * 1/2003 Yeager et al. ................ 257/100
6,791,034 B2 * 9/2004 Suzumura et al. ........... 174/252

* cited by examiner

Primary Examiner—Joseph Williams
(74) Attorney, Agent, or Firm—Bacon & Thomas

(57) ABSTRACT

This invention relates to a reflecting device for flat panel displays, including a light source, a nonconductive base having a groove, and a reflector disposed on the inner surface of the groove of the nonconductive base to reflect rays of light coming from the light source to the exterior of the groove wherein the light source is located within the groove and the reflector is located between the nonconductive base and the light source. Also, a method for making the reflecting device for flat panel displays is disclosed.

18 Claims, 3 Drawing Sheets

REFLECTING DEVICE FOR FLAT PANEL DISPLAYS AND METHOD OF MAKING THE SAME

BACKGROUND OF THE INVENTION

1. Field of the Invention

The present invention relates to a reflecting device for flat panel displays and method of making the same, and more particularly, to a reflecting device well suited to a liquid crystal display and method of making the same.

2. Description of Related Art

The flat panel display having advantages of small size, light weight and thin thickness is popular in the market and has become the main stream choice of the displays. However, there are still a number of problems that need to be solved for the flat panel displays; for example, the light source inside the flat panel display frequently has a current leakage problem that results in a waste of power consumption and degradation of picture quality.

The current leakage of the light source inside the flat panel displays, particularly inside a liquid crystal display, is caused mainly by improper design of the reflector of the light source (e.g., a cold cathode fluorescent lamp (CCFL)). A conventional reflector of the light source is made of metal, and a reflective layer is coated on the inner surface of the metal material to reflect rays of light coming from the light source onto the flat panel display. However, the reflector made of a metal material is susceptible to causing current leakage because of the formation of capacitance. In addition to that, the reflective layer used in the conventional manner is usually made of a conductive material (e.g., silver) such that the current leakage problem is hard to be avoided or reduced. As a result, a waste of power consumption and degradation of picture quality occur at all times.

Therefore, it is desirable to provide an improved reflecting device for flat panel displays and a method of making the same to mitigate and/or obviate the aforementioned problems.

SUMMARY OF THE INVENTION

It is an object of the present invention to provide a reflecting device for flat panel displays so as to reduce or avoid current leakage, reduce power consumption, increase reflection efficiency and flat panel display brightness, and save material cost.

It is another object of the present invention to provide a method for manufacturing a reflecting device for flat panel displays so as to reduce or avoid current leakage, reduce power consumption, increase reflection efficiency and flat panel display brightness, save material cost, simplify processing steps, and save processing time.

To achieve the above objects, a reflecting device for flat panel displays according to the present invention comprises a light source, a nonconductive base having a groove, and at least a reflector disposed on the inner surface of the groove of the nonconductive base to reflect rays of light coming from the light source to an exterior of the groove wherein the light source is received within the groove and the reflector is located between the nonconductive base and the light source.

A method for manufacturing a reflecting device for flat panel displays according to the present invention, in cooperation with at least a light source, comprises the following steps: providing a nonconductive base having at least a groove for locating said light source, securely positioning a reflector in the groove of the nonconductive base, and securely positioning the light source in the groove of the nonconductive base wherein the reflector is located between the nonconductive base and the light source.

A method for manufacturing a reflecting device for flat panel displays according to the present invention, in cooperation with at least a light source, comprises the following steps: forming fold lines for bending on the surface of a nonconductive substrate, adhering a reflector to the nonconductive substrate to form a composite reflector wherein a surface of the reflector contacts closely with the surface, on which the fold lines are formed, of the nonconductive substrate, and bending the composite reflector to form a nonconductive base having at least a groove for locating the light source.

Other objects, advantages, and novel features of the invention will become more apparent from the following detailed description when taken in conjunction with the accompanying drawings.

DETAILED DESCRIPTION OF THE PREFERRED EMBODIMENT

The light source of the reflecting device according to the present invention is not specifically restricted, and can be any conventional one. Preferably, the light source is a cold cathode fluorescent lamp (CCFL) or light emitting diode. The material of the nonconductive base of the reflecting device according to the present invention is not specifically restricted. Preferably, the nonconductive base is made of plastics, polyester (PET) or non-metal materials. The reflector of the reflecting device according to the present invention is not specifically restricted, and can be any conventional one. Preferably, the reflector is nonconductive, and more preferably, the reflector is a nonconductive specular reflector. The technique for securely positioning the reflector in the groove of the nonconductive base according to the method for manufacturing the reflecting device of the present invention is not specifically defined, and can be any conventional one for securely positioning the reflector. Preferably, the reflector is placed and fixed in the groove of the nonconductive base by utilizing adhesive or hot-pressing; or optionally, the reflector is inserted into the groove of the nonconductive base in a bent manner and then fixed therein. The technique for forming the nonconductive base according to the present invention is not specifically defined, and can be any conventional one for forming the base. Preferably, the nonconductive base is formed by injection molding or extrusion. The technique for forming the composite reflector according to the present invention is not specifically defined, and can be any conventional one for forming the composite reflector. Preferably, the reflector is adhered to the nonconductive substrate by adhesion or hot-pressing. The technique for bending the composite reflector is not specifically defined, and can be any conventional one for bending the composite reflector. Preferably, the reflector is optionally bent by hot-pressing, punching, and shearing to form a nonconductive base having at least one groove.

Figure 1:
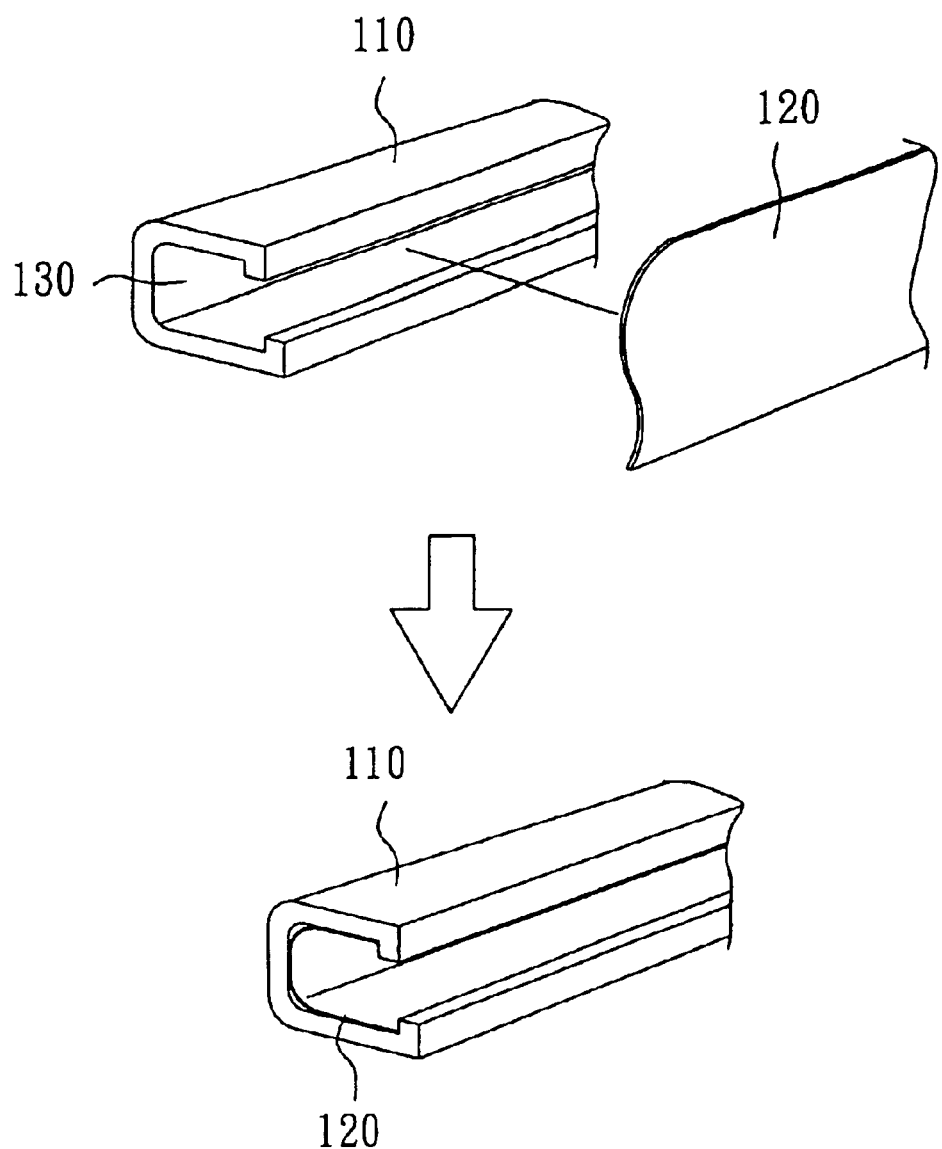
FIG. 1 is a schematic view showing a first preferred embodiment of a method for manufacturing a reflecting device for flat panel displays according to the present invention.

Referring to FIG. 1, which is a schematic view showing a first preferred embodiment of a method for manufacturing a reflecting device for flat panel displays according to the present invention, the reflecting device comprises a nonconductive base 110 having a groove 130, and a reflector 120 disposed on the inner surface of the groove 130 of the nonconductive base 110. The reflecting device cooperates with a light source (not shown) located in the groove 130 to reflect rays of light coming from the light source to the exterior of the groove 130. In this embodiment, the nonconductive base 110 having the groove 130 is provided to receive the light source such as a CCFL. The nonconductive base 110 can be fabricated by any of the known processes. In this embodiment, the nonconductive base 110 is formed by injection molding or extrusion. The nonconductive base 110 can be made of any nonconductive material. In this embodiment, the nonconductive base 110 is made of plastics. Then, a nonconductive specular reflector is bent and inserted into the groove 130 of the nonconductive base 110. The nonconductive specular reflector 120 is elastic for facilitating its insertion into the groove 130 of the nonconductive base 110. It is preferable for the groove 130 to have a salient or protuberance at its periphery for locking the nonconductive specular reflector 120. In this embodiment, the nonconductive specular reflector 120 can be the ESR (enhanced specular reflector) manufactured by 3M™, for example. The nonconductive specular reflector 120 can be optionally placed in the groove of the nonconductive base, and fixed with adhesive or by hot-pressing to hold the reflector 120 for further secure assembly. Then, the reflecting device for flat panel displays of the present embodiment will cooperate with the assembled light source and the related wires or components to produce a complete set of a flat panel display for further application.

Figure 2:
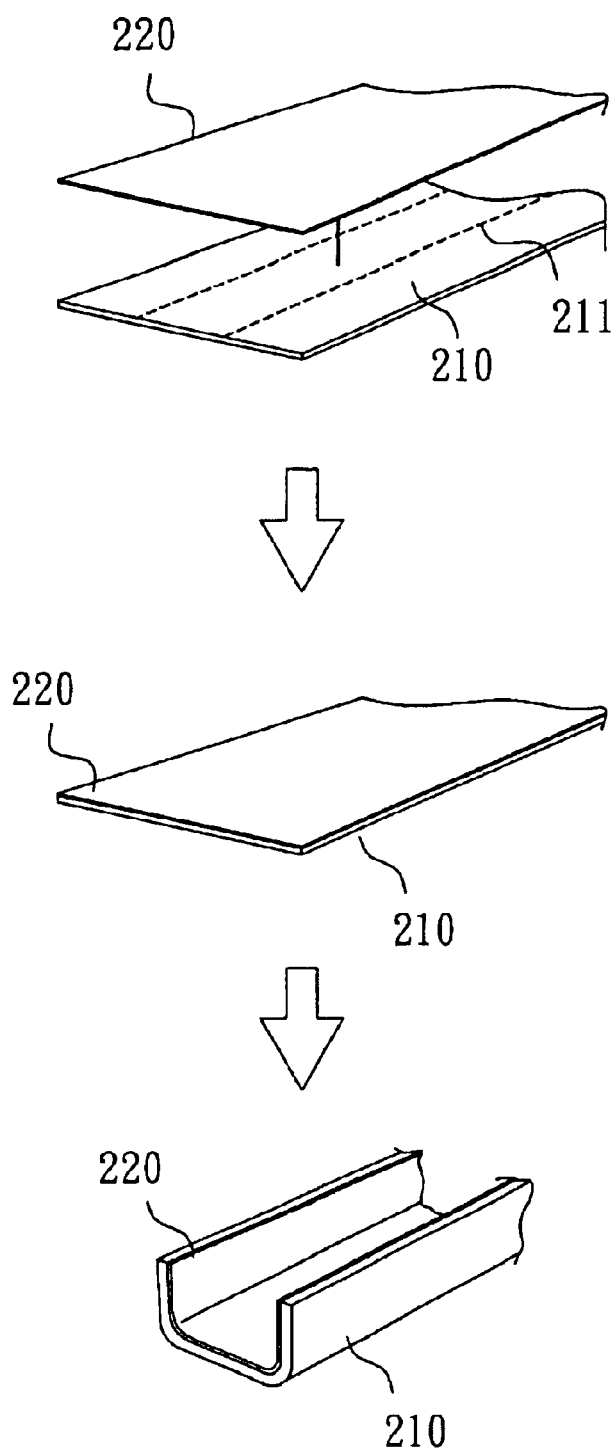
FIG. 2 is a schematic view showing a second preferred embodiment of a method for manufacturing a reflecting device for flat panel displays according to the present invention.

Referring to FIG. 2, which is a schematic view showing a second preferred embodiment of a method for manufacturing a reflecting device for flat panel displays according to the present invention, the reflecting device comprises a nonconductive base 210 having a groove, and a reflector 220. The reflecting device cooperates with a light source (not shown) which is received in the groove for reflecting rays of light coming from the light source to the exterior of the groove. In this embodiment, a nonconductive substrate material 210 is provided. The surface of the nonconductive substrate material 210 is sliced with a cutting knife to form fold lines 211 to facilitate a subsequent bending. Then, a nonconductive specular reflector 220 is adhered and fixed to the nonconductive substrate material, wherein one surface of the reflector 220 contacts closely with the surface, on which the fold line 211 is formed, of the nonconductive substrate material 210 or with the surface of the other side, depending on the fold lines. In this embodiment, the nonconductive specular reflector 220 is adhered and fixed to the nonconductive substrate material 210 with adhesive or by hot-pressing to form a composite reflector. Then, the composite reflector is bent along the fold line 211 by metalwork and mechanic to form the reflecting device for flat panel displays. In this embodiment, the material of the nonconductive substrate, the material of the reflector, and the cooperation manner with the light source are all the same as those of the first embodiment.

Figure 3:
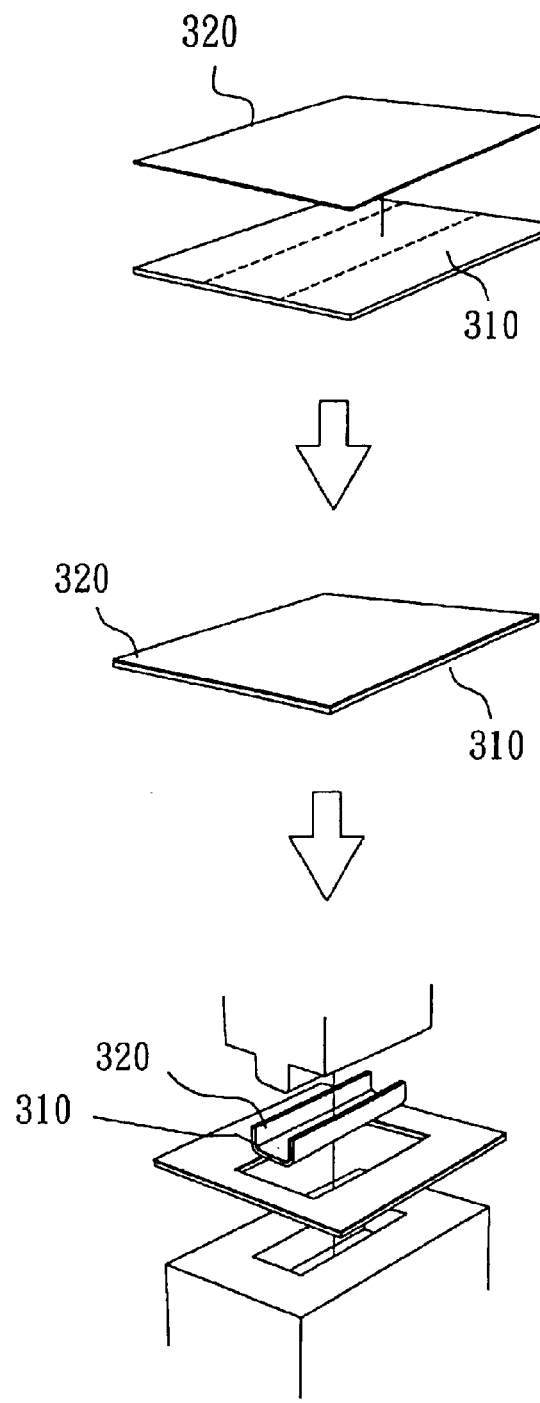
FIG. 3 is a schematic view showing a third preferred embodiment of a method for manufacturing a reflecting device for flat panel displays according to the present invention.

Referring now to FIG. 3, which is a schematic view showing a third preferred embodiment of a method for making a reflecting device for flat panel displays according to the present invention, the reflecting device that is similar to that of the second preferred embodiment, comprises a nonconductive base 310 having a groove, and a reflector 320. In this embodiment, the composite reflector is punched, sheared and hot-pressed by a preset punch head at one time to save manufacturing time and processing steps. In this embodiment, the material of the nonconductive substrate, the material of the reflector, and the cooperation manner and application of the light source are all the same as those of the first embodiment.

Because both the base and the reflector of the reflecting device for flat panel displays according to the present invention are made of a nonconductive material, the reflecting device for a flat panel display of the present invention is capable of reducing or avoiding current leakage, reducing power consumption and material cost, and increasing light efficiency and brightness of flat panel displays. In addition, the use of the nonconductive material for both the base and the reflector is able to simplify the processing steps and save manufacturing time, as opposed to the conventional use of a metal.

Although the present invention has been explained in relation to its preferred embodiments, it is to be understood that many other possible modifications and variations can be made without departing from the scope of the invention as hereinafter claimed.

What is claimed is:

1. A method for manufacturing a reflecting device for flat panel displays, in cooperation with at least a light source, comprising the following steps:

forming fold lines for bending on the surface of a nonconductive substrate;

adhering a reflector to said nonconductive substrate to form a composite reflector; and bending said composite reflector to form a nonconductive base having at least a groove;

wherein said groove is used for locating said light source.

2. The method as claimed in claim 1, wherein said reflector is adhered to said nonconductive substrate by adhesion or hot-pressing.

3. The method as claimed in claim 1, wherein said composite reflector is bent to form a nonconductive base having at least a groove by hot-pressing, punching, and shearing.

4. The method as claimed in claim 1, wherein said reflector is nonconductive.

5. The method as claimed in claim 1, wherein said light source is a cold cathode fluorescent lamp (CCFL) or a light emitting diode.

6. The method as claimed in claim 1, wherein said nonconductive base is made of plastics, polyester or a non-metal material.

7. The method as claimed in claim 1, wherein said flat panel display is a liquid crystal display.

8. A method for manufacturing a reflecting device for flat panel displays, in cooperation with at least a light source, comprising the following steps:

providing a nonconductive base having at least a groove for locating said light source;

securely inserting a reflector into said groove of said nonconductive base in a bent manner; and securely positioning said light source in said groove of said nonconductive base wherein said reflector is located between said nonconductive base and said light source.

9. The method as claimed in claim 8, wherein said reflector is placed and fixed in said groove of said nonconductive base by utilizing adhesive or hot-pressing.

10. The method as claimed in claim 8, wherein said light source is a cold cathode fluorescent lamp (CCFL) or a light emitting diode.

11. The method as claimed in claim 8, wherein said reflector is nonconductive.

12. The method as claimed in claim 8, wherein said nonconductive base is made of plastics, polyester or a non-metal material.

13. The method as claimed in claim 8, wherein said nonconductive base is produced by injection molding or extrusion.

14. A method for manufacturing a reflecting device for flat panel displays, in cooperation with at least a light source, comprising the following steps:

providing a nonconductive base having at least a groove for locating said light source;

securely positioning a nonconductive reflector in said groove of said nonconductive base; and securely positioning said light source in said groove of said nonconductive base wherein said nonconductive reflector is located between said nonconductive base and said light source.

15. The method as claimed in claim 14, wherein said nonconductive reflector is placed and fixed in said groove of said nonconductive base by utilizing adhesive or hot-pressing.

16. The method as claimed in claim 14, wherein said light source is a cold cathode fluorescent lamp (CCFL) or a light emitting diode.

17. The method as claimed in claim 14, wherein said nonconductive base is made of plastics, polyester or a non-metal material.

18. The method as claimed in claim 14, wherein said nonconductive base is produced by injection molding or extrusion.

* * * * *